(12) United States Patent
Nishino et al.

(10) Patent No.: US 7,672,692 B2
(45) Date of Patent: Mar. 2, 2010

(54) POINTING DEVICE HAVING IMPROVED OPERABILITY, ITS CONTROL METHOD AND MOBILE TELEPHONE

(75) Inventors: Takeshi Nishino, Shinagawa (JP); Shuji Nakamura, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 75 days.

(21) Appl. No.: 10/643,953

(22) Filed: Aug. 20, 2003

(65) Prior Publication Data

US 2004/0176140 A1 Sep. 9, 2004

(30) Foreign Application Priority Data

Nov. 7, 2002 (JP) .............................. 2002-324198

(51) Int. Cl.
*H04W 4/00* (2006.01)

(52) U.S. Cl. ........................ 455/566; 345/157; 345/158; 345/159; 345/160; 345/161; 345/162; 345/163; 345/164

(58) Field of Classification Search ................ 455/566, 455/466; 345/175, 157, 158, 159, 160, 161, 345/162, 163, 164
See application file for complete search history.

(56) References Cited

U.S. PATENT DOCUMENTS

| 6,765,598 B2 * | 7/2004 | Kim ............................ 715/857 |
| 2002/0030668 A1 * | 3/2002 | Hoshino et al. ............. 345/175 |
| 2002/0155857 A1 * | 10/2002 | Nishimoto ................... 455/550 |
| 2004/0023694 A1 | 2/2004 | Mori et al. |

FOREIGN PATENT DOCUMENTS

| JP | 05181603 A * | 7/1993 |
| JP | 9-251344 | 9/1997 |
| JP | 10-239762 | 9/1998 |
| JP | 2002-290518 | 10/2002 |
| JP | 5-181603 | 7/2003 |

OTHER PUBLICATIONS

Communication from the Japanese Patent Office in the corresponding Japanese patent application mailed on Feb. 26, 2008.

* cited by examiner

*Primary Examiner*—Dwayne Bost
*Assistant Examiner*—Pierre-Louis Desir

(57) ABSTRACT

A pointing device that can be operated to move an operational object on a display screen in any direction comprises a control unit for changing an operation mode of the pointing device according to contents displayed on the display screen and, further, a mobile telephone comprises such a pointing device.

15 Claims, 13 Drawing Sheets

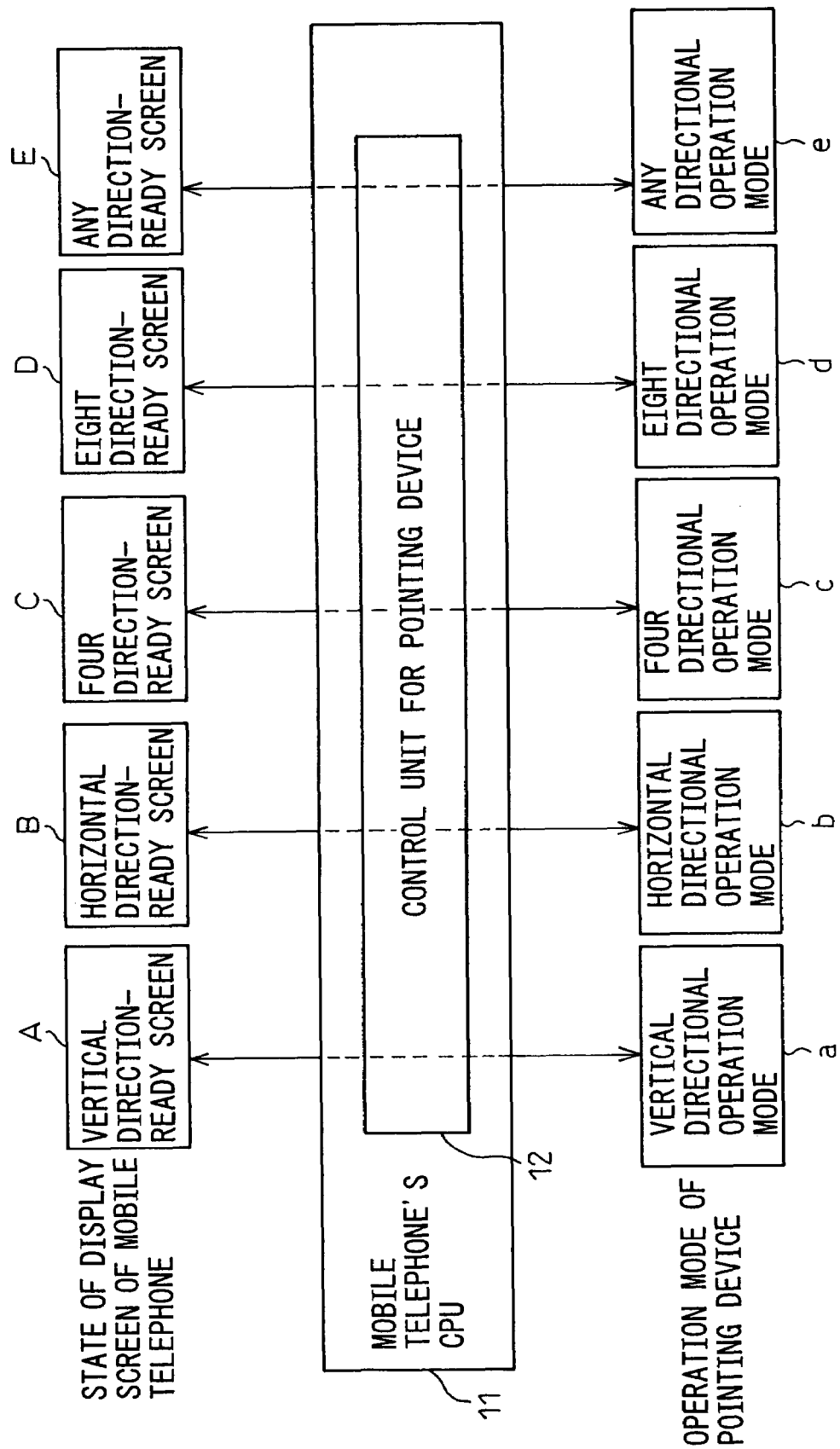

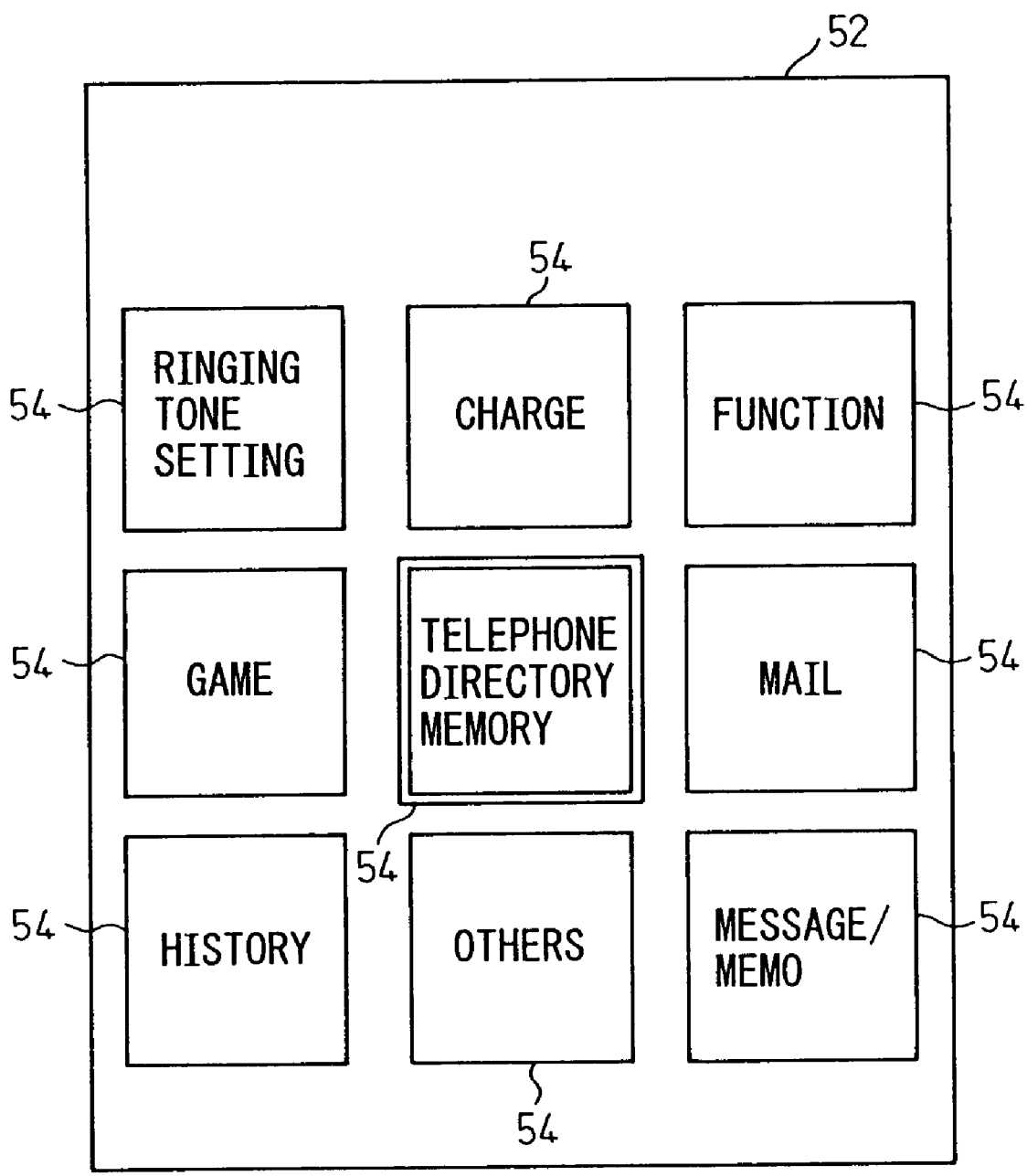

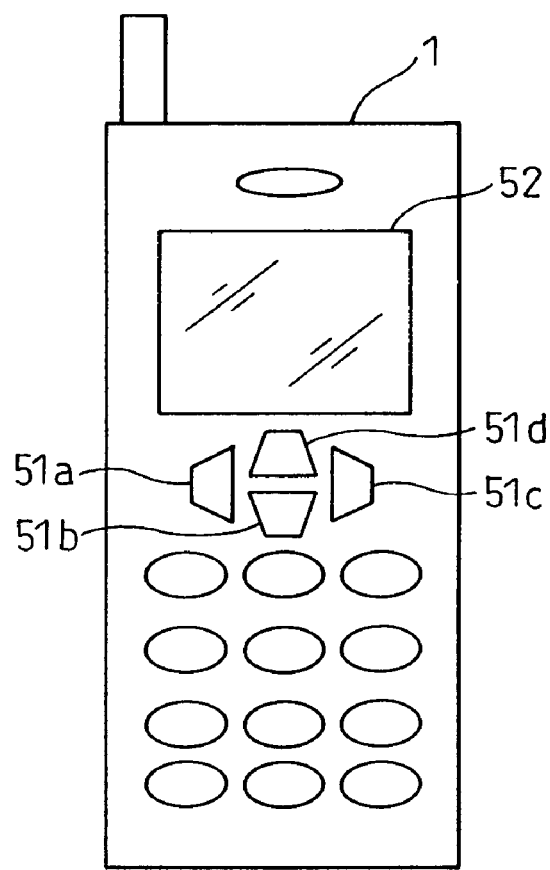
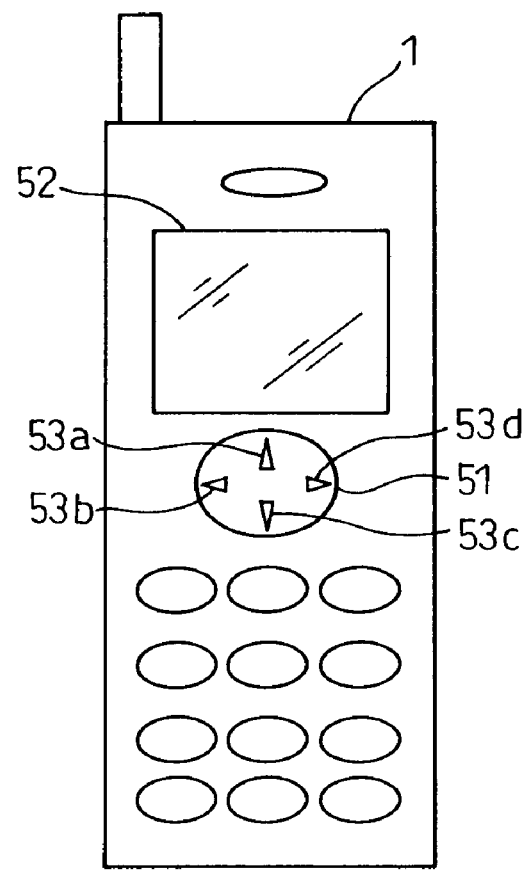

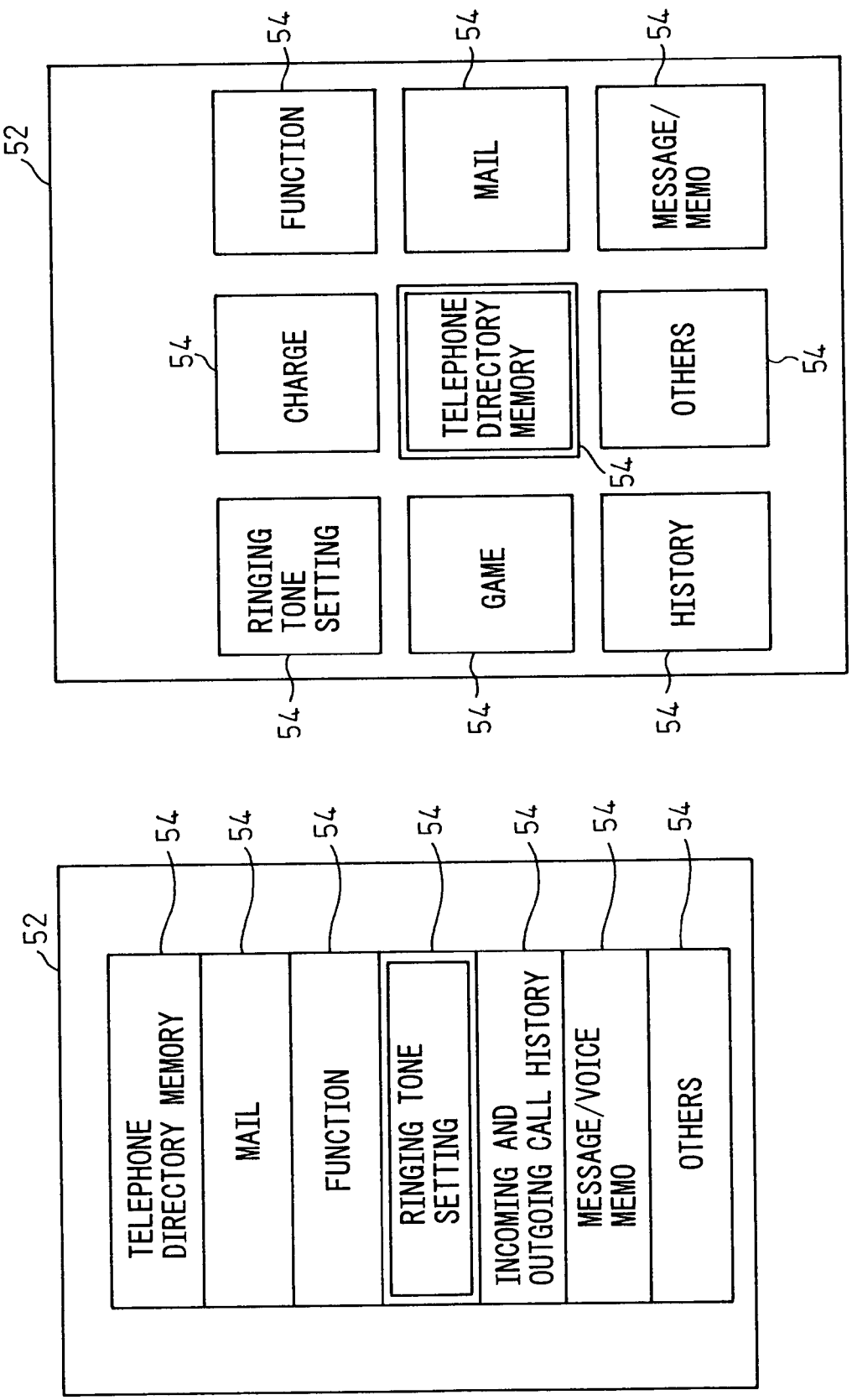

POINTING DEVICE HAVING IMPROVED OPERABILITY, ITS CONTROL METHOD AND MOBILE TELEPHONE

BACKGROUND OF THE INVENTION

1. Field of the Invention

The present invention relates to a pointing device that can be operated to move an operational object on a display screen in any direction and at any speed, its control method and as a mobile telephone provided with such pointing device.

2. Description of the Related Art

A mobile telephone is provided with operating buttons for inputting numerals or characters and operating buttons, a jog dial, and the like, for moving a cursor, a pointer or a selection frame displayed on a display screen of the mobile telephone.

FIGS. 12a and 12b are front elevational views of typical mobile telephones.

Operating buttons 51 for moving a cursor, a pointer or a selection frame displayed on a display screen 52 of a mobile telephone 1 may take various forms. The operating buttons, in any form, are provided with four on-off operating mechanical switches (not shown) thereunder, which correspond to the up-and-down and the left-and-right directions on the display screen 52, for moving an operational object such as the cursor, the pointer or the selection frame on the display screen 52 in the up-and-down and left-and-right directions.

For example, as shown in FIG. 12a, mechanical switches (not shown) may be provided just under each of four independent operating buttons 51a, 51b, 51c and 51d in the up-and-down and the left-and-right positions. Alternatively, in another example shown in FIG. 12b, there is provided one operating button 51, on the surface of which marks 53a, 53b, 53c and 53d are printed for indicating the up-and-down and left-and-right directions and, then, mechanical switches (not shown) are disposed just under each of the marks 53a, 53b, 53c and 53d.

In each case, when a user pushes down a desired position of the operating buttons 51, 51a, 51b, 51c and 51d, only one mechanical switch disposed just under the pushed position among the four mechanical switches turned on to output a specific signal. Therefore, according to the above configuration, when the operation buttons 51, 51a, 51b, 51c and 51d are operated, the operational object such as the cursor, the pointer or the selection frame can be moved only in either one of up, down, left and right directions.

FIGS. 13a and 13b are diagrams illustrating menu representations displayed on the display screen of the mobile telephone.

The mobile telephone not only functions as a telephone but also has various features and usages (applications) available to the user such as an internet connection function, an e-mail function, games, a mobile telephone ringing tone setting, an incoming and outgoing call history, a telephone directory memory and so on. The menu representations as illustrated in FIGS. 13a and 13b are typically provided for allowing the user to select such features and usages of the mobile telephone easily. The user refers to the menu representation on the display screen 52 and manipulates the operating buttons (not shown) to move the selection frame (indicated as frames enclosed in double lines in FIGS. 13a and 13b and thereafter) to the position of an icon 54 indicating the feature or usage the user desires.

For example, in the example shown in FIG. 13a, on the display screen 52, the icons 54 for indicating the features and usages that the user can select are disposed in the vertical direction. Alternatively, in the example shown in FIG. 13b, the icons 54 are disposed in eight directions including up, down, left and right. Besides these examples, though not shown here, the icons may be disposed only in the transverse direction or the icons that cannot be displayed on the display screen at a time may be displayed in a scrolling manner. Generally speaking, the display form of the menu on the display screen of the mobile telephone can be customized into an icon arrangement that the user desires.

On the other hand, a pointing device that can output a signal for moving the operational object such as the cursor, the pointer or the selection frame on the display screen in any direction and at any speed has already been implemented and is often used mainly as a coordinate input device for a computer.

Here, by way of example, the operational principle of a pointing device employing a variation of magnetism will be described briefly.

FIGS. 14 and 15 are principle drawings of the pointing device employing a variation of magnetism.

The pointing device 2 is comprised of a magnet 61 that co-operates with an operating part (not shown) and magnetic reaction elements S1, S2, S3 and S4 for detecting an inclination (in the case of FIG. 14) or a movement (in the case of FIG. 15) of the magnet 61.

The magnetic reaction elements S1, S2, S3 and S4 convert a magnetic field into a voltage to be output and are disposed symmetrically with regard to a predetermined reference point on a substrate 62. For example, the magnetic conversion elements S1 and S2 may be disposed in the X direction and the magnetic conversion elements S3 and S4 may be disposed in the Y direction, respectively.

The magnet 61 has a cylindrical configuration and forms the magnetic field in the vertical direction with regard to its bottom surface. The magnet 61 is disposed above the substrate 62 so that the line normal to the center of the bottom surface of the magnet 61 passes through the substrate 62 vertically at the reference point mentioned above.

When the magnet 61 is not operated or, in other words, when the bottom surface of the magnet 61 is maintained in parallel with the substrate 62 (FIG. 14) or when the center of the bottom surface of the magnet 61 is located on the line normal to the reference point described above (FIG. 15), the magnet 61 is spaced substantially equidistantly from each of the magnetic reaction elements S1, S2, S3 and S4. Here, it is to be noted that the position of the magnet 61 at this time is referred to as the return position in this specification. When the magnet 61 is located at the return position, a substantially equal magnetic field is applied to each of the magnetic reaction elements S1, S2, S3 and S4 and, therefore, each magnetic reaction element outputs an equal voltage value.

When the magnet 61 is manipulated so that it is inclined or moved, the magnetic fields applied to the respective magnetic reaction elements S1, S2, S3 and S4 are changed and the voltage value output from the respective magnetic reaction elements are also changed. For example, when the magnet 61 is inclined or moved positively in the X direction, the output voltage of the magnetic reaction element S1 becomes larger than the output voltage of the magnetic reaction element S2.

From such a variation of the output of each of the magnetic reaction elements S1, S2, S3 and S4, a signal that can move the operational object on the display screen in any direction and at any speed can be calculated.

As described above, as the pointing device employing a variation of magnetism has an advantage in that it has good operability and it can be reduced in size and weight relatively easily, it is coming into widespread use not only as the coordinate input device for the computer but also as control command devices for various electrical apparatus such as machine tools, robots, transportation machines, medical equipment, game machines and so on.

As the features of the mobile telephone, such as the internet connection feature and the game feature, become increasingly sophisticated, it is expected that a pointing device that can be operated to move the operational object on the display screen in any direction will be adopted into compact mobile equipment including mobile telephones, in place of the conventional operation buttons of the mechanical switch type.

As described above, in mobile telephones, for example, the icons of the various features and usages that the user can select are displayed as the menu in rows in the vertical and/or horizontal directions on the display screen. Therefore, in the case of such menu representation, the operability may be improved if the operational object such as the cursor, the pointer or the selection frame can be moved only in the vertical or horizontal directions along which the icons are arranged.

As an example of the conventional techniques, as disclosed in Japanese Unexamined Patent Publication No. 10-239762, there has been proposed a machine adopting a joystick that can move a cursor in any direction by manipulating one lever as means for moving the cursor on a display screen when a desired image pattern is selected from a menu representation.

Further, as disclosed in Japanese Unexamined Patent Publication No. 5-181603, there has been proposed a mouse that is operated while pressing down a particular button provided on the mouse when it is desired to move a cursor only in one of the up, down, left and right directions.

Thus, various contrivances have been made for moving the operational object such as the cursor on the display screen efficiently.

It should be avoided to restrict the biggest advantage of the pointing device in that the operational object on the display screen can be operated in any direction and at any speed. Therefore, though the features of the mobile telephone and, in particular, the menu features, may be enhanced for accommodating the pointing device that can be operated in any direction and at any speed, the development of such features may take very much time and effort in this case because an operating system that is commonly used dedicatedly for the mobile telephone at present must be improved fundamentally. Further, from the viewpoint of the user, it may be preferred that the operability of the operation buttons of the mechanical switch type as described above that has been familiar to the user is reserved to some extent.

Therefore, in view of the above problem, it is an object of the present invention to provide a pointing device having improved operability that can be operated to move an operational object on a display screen in any direction, and its control method, as well as a mobile telephone provided with such pointing device.

SUMMARY OF THE INVENTION

In order to achieve the above object, in the present invention, a pointing device that can be operated to move an operational object on a display screen in any direction changes the operation mode of the pointing device automatically according to contents displayed on a display screen of an apparatus provided with the pointing device.

More specifically, the operation mode of the pointing device is changed by limiting a moving direction of the operational object on the display screen automatically according to the contents displayed on the display screen just when the pointing device is operated.

In particular, in the mobile telephone in which icons, of various features and usages that a user can select, are displayed as a menu in rows in the vertical and/or horizontal directions and, when the pointing device according to the present invention is applied, the pointing device is configured so that it can be operated in the same direction as the one in which the operational object such as a cursor, a pointer or a selection frame can be moved. Thus, the direction in which the pointing device can be operated is limited automatically according to a representation on the display screen based on an application executed at present.

According to the present invention, even when the pointing device is used for an application that does not need to move the operational object such as the cursor, the pointer or the selection screen in any direction, the user can operate the pointing device without a sense of incongruity.

BRIEF DESCRIPTION OF THE DRAWINGS

The present invention will be more clearly understood from the description as set below with reference to the accompanying drawings, wherein:

FIG. 1 is a functional block diagram of a pointing device according to an embodiment of the present invention;

FIG. 6a is a diagram showing a menu representation in which icons are arranged in both vertical and horizontal directions in the mobile telephone provided with the pointing device according to the embodiment of the present invention;

FIGS. 12*a* and 12*b* are front elevational views illustrating typical mobile telephones;

FIGS. 13*a* and 13*b* are diagrams illustrating menu representations displayed on the display screen of the mobile telephone;

DESCRIPTION OF THE PREFERRED EMBODIMENTS

Figure 2A:
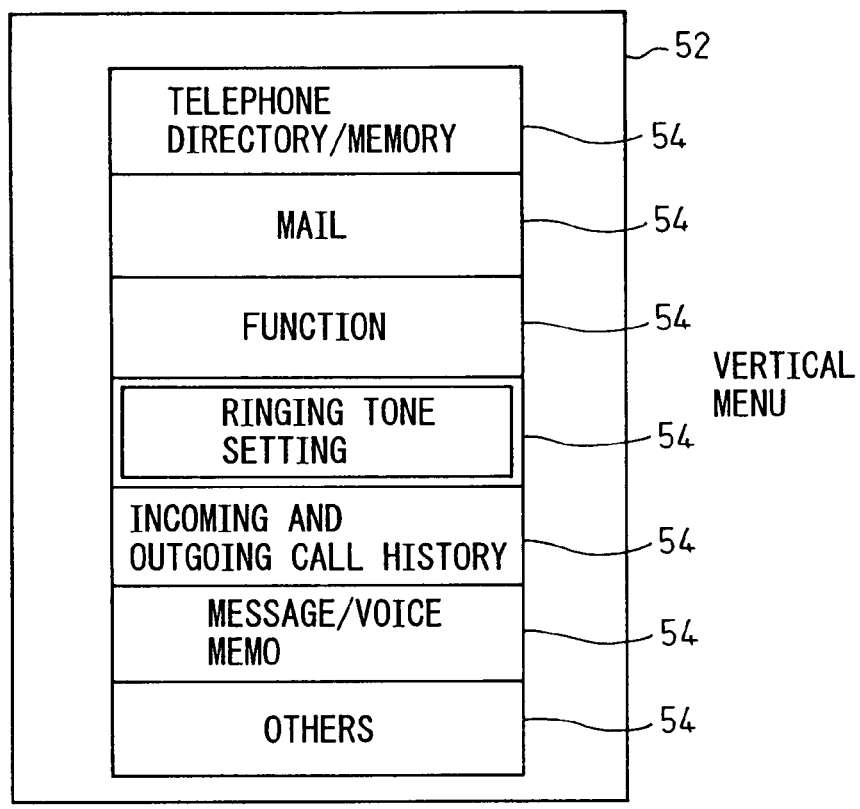
FIG. 2a is a diagram showing a menu representation in which icons are arranged in a vertical direction on a display screen in a mobile telephone provided with the pointing device according to the embodiment of the present invention.

As an embodiment of the present invention, a mobile telephone provided with a pointing device according to the present invention will be described. As described above, in typical mobile telephones, when a menu of various features and usages a user can select is displayed, icons are displayed in rows in vertical and/or horizontal directions.

Though the mobile telephone is described as an example here, it is to be noted that a pointing device according to the present invention may be applied to mobile information terminals, for example, such as a PDA. For example, also in the PDA, when a menu of various applications is displayed, icons corresponding to each application are displayed in rows in vertical and/or horizontal directions on a display screen of the PDA.

Further, though it is assumed that the pointing device of the type employing a variation of magnetism is used, the pointing device of other types, e.g., the pointing device of the type employing a strainmeter or the pointing device of the type employing a variation of electric capacitance, may be used.

FIG. 1 is a functional block diagram of the pointing device according to an embodiment of the present invention.

The pointing device according to this embodiment comprises a control unit 12 for changing an operation mode of the pointing device according to contents displayed on a display screen just when the pointing device is operated. The control unit 12 is implemented in a main CPU 11 in the form of firmware.

Typically, the CPU 11 in the mobile telephone controls various features and usages of the mobile telephone. For example, it controls features of various applications such as a telephone function, an internet connection function, an e-mail function, games, a mobile telephone ringing tone setting, an incoming and outgoing call history, a telephone directory memory, and a function for displaying icons corresponding to each function as a menu.

According to this embodiment, the control unit 12 in the CPU 11 limits a moving direction of an operational object on a display screen automatically according to the contents displayed on the display screen just when the pointing device is operated.

Typically, the pointing device can be operated in any direction. Thus, the operational object such as a cursor, a pointer or a selection frame can be moved in any direction corresponding to the operational direction of the pointing device. Therefore, such pointing device is also effective for operating the applications running on the mobile telephone such as the Internet and the games.

As described above, in the mobile telephone, the icons are displayed as the menu in rows in vertical and/or horizontal directions on the display screen. Therefore, when the menu is displayed, it may be difficult to operate the operational object such as the cursor, the pointer or the selection frame if the operational object can be moved in any direction and, further, in view of the user's operability, it may be rather preferable if the operational object can be moved only in the direction in which the icons are arranged.

Thus, the optimal operating conditions of the cursor, the pointer or the selection frame may vary depending on the applications running at present such as the menu representation, the Internet or the games, or depending on the contents displayed on the display screen at present. In the pointing device according to the present invention, the comfortable operability of the pointing device that is suitable for the contents displayed on the display screen just when the pointing device is operated is implemented.

As the CPU 11 of the mobile telephone controls various processes of the mobile telephone in an integrated manner, it, of course, grasps the contents displayed on the display screen at present and, therefore, according to this embodiment, the control unit 12 implemented in the CPU 11 in the form of firmware can change the optimal operation mode depending on the contents displayed on the display screen just when the pointing device is operated.

Here, the contents displayed on the display screen are classified as follows.

Typically, when the menu is displayed on the display screen of the mobile telephone, the icon arrangement can be customized as the user desires. In this specification, the menu representation in which the icons are arranged in the vertical direction is referred to as the "vertical direction-ready screen A", the menu representation in which the icons are arranged in the horizontal direction is referred to as the "horizontal direction-ready screen B", the menu representation in which the icons are arranged in at least two rows in each of the vertical and horizontal directions or arranged in the form of a cross is referred to as the "four direction-ready screen C", and the menu representation in which the icons are arranged in at least two rows in each of the vertical and horizontal directions is referred to as the "eight direction-ready screen D".

Further, the screen representation based upon the applications that can be operated to move the operational object on the display screen in any direction is refereed to as the "any direction-ready screen E".

Still further, the operation modes of the pointing devices corresponding to the "vertical direction-ready screen A", the "horizontal direction-ready screen B", the "four direction-ready screen C", the "eight direction-ready screen D", and the "any direction-ready screen E" are referred to as the "vertical directional operation mode a", the "horizontal directional operation mode b", the "four directional operation mode c", the "eight directional operation mode d", and the "any directional operation mode e", respectively.

Figure 2B:
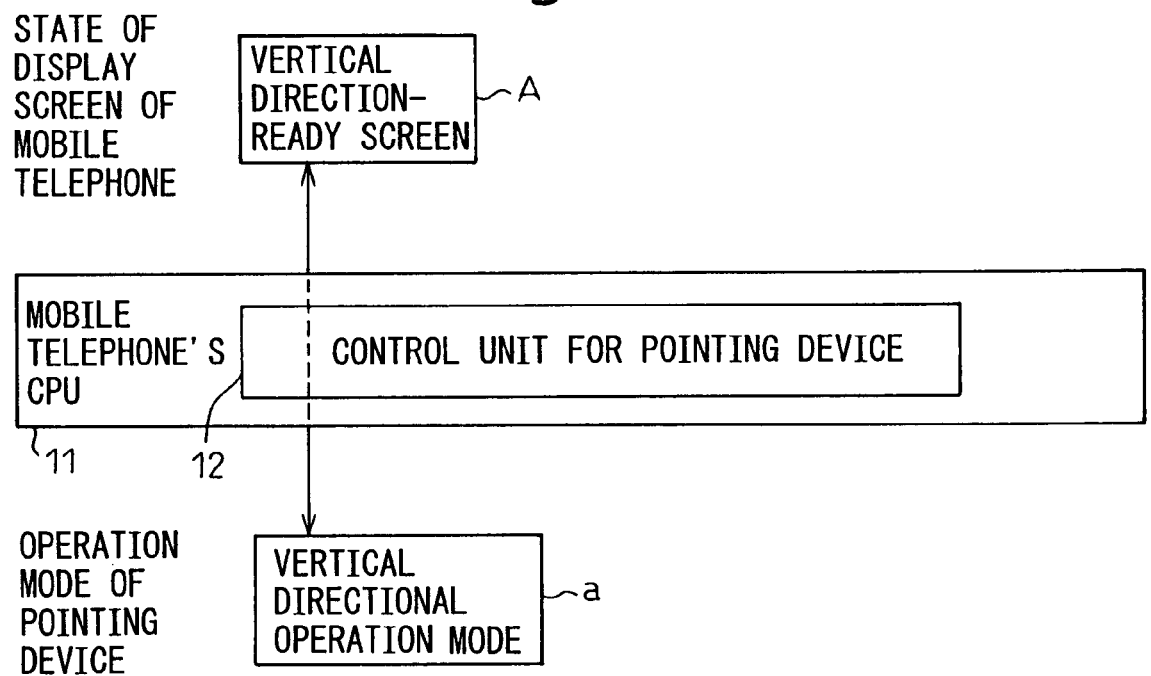
FIG. 2b is a functional block diagram of the pointing device shown in FIG. 2a in the mobile telephone provided with the pointing device according to the embodiment of the present invention.

FIG. 2*a* is a diagram showing the menu representation in which the icons are arranged in the vertical direction on the display screen in the mobile telephone provided with the pointing device according to the embodiment of the present invention. Further, FIG. 2*b* is a functional block diagram of the pointing device shown in FIG. 2*a* in the mobile telephone provided with the pointing device according to the embodiment of the present invention.

In the case of the vertical direction-ready screen A as shown in FIG. 2a, the selection frame showing the icon selection state (the frame enclosed in double lines in the figure) can be moved only in the vertical direction, in which the icons 54 are arranged on the display screen 52.

As described above, as the CPU 11 of the mobile telephone controls the various processes of the mobile telephone in an integrated manner, it detects that the vertical direction-ready screen A is displayed on the display screen 52 and, therefore, the control unit 12 implemented in the CPU 11 in the form of firmware limits the movement of the selection frame on the display screen 52 to only in the vertical direction. The operation mode of the pointing device at this time is the vertical directional operation mode a.

Figure 3A:
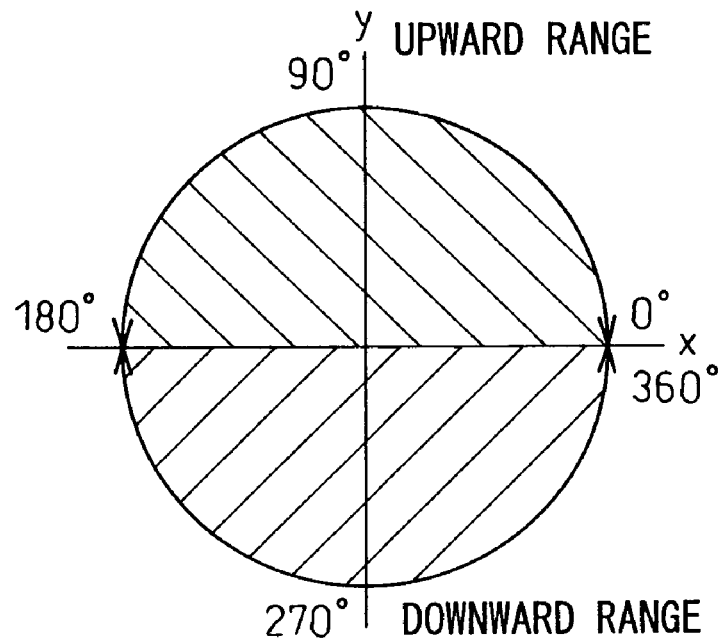
FIGS. 3a and 3b are diagrams showing a range in which the pointing device can be operated when the pointing device according to the embodiment of the present invention is in a vertical directional operation mode.
Figure 3B:
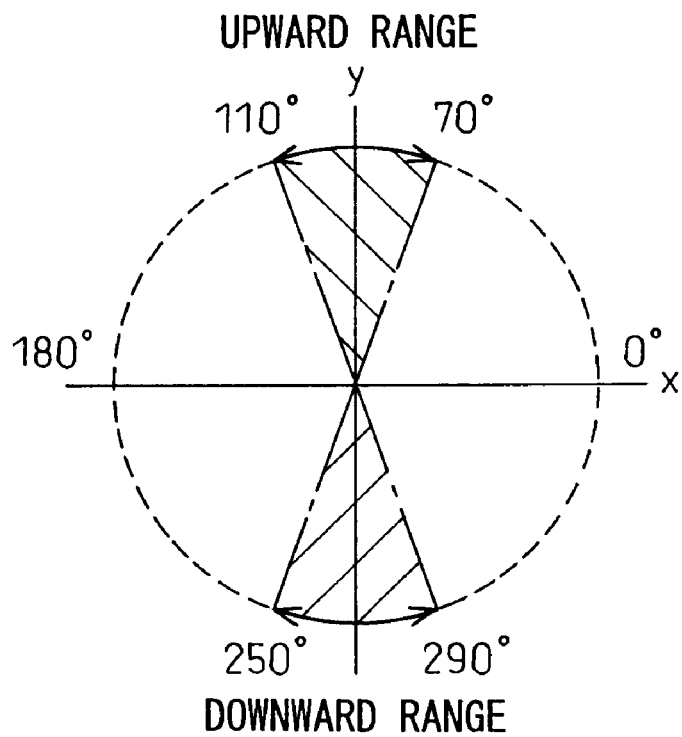

FIGS. 3a and 3b are diagrams showing a range in which the pointing device can be operated when the pointing device according to the embodiment of the present invention is in the vertical directional operation mode.

In these figures, the operational direction of the pointing device itself is expressed on the xy plane. On this xy plane, the positive direction on the x axis is defined as 0 degrees (360 degrees), the positive direction on the y axis is defined as 90 degrees, the negative direction on the x axis is defined as 180 degrees, and the negative direction on the y axis is defined as 270 degrees. In the pointing device that can be operated in any direction, the positive direction on the y axis corresponds to the operation of the pointing device in the upward direction and the negative direction on the y axis corresponds to the operation of the pointing device in the downward direction. Then, the positive direction on the x axis corresponds to the operation of the pointing device in the right direction and the negative direction on the x axis corresponds to the operation of the pointing device in the left direction. These definitions are effective also in FIG. 5a, 5b and FIGS. 7a-7c described above.

According to this embodiment, when the pointing device is in the vertical directional operation mode a, if the pointing device is operated into the range of the first and second quadrants shown in FIG. 3a, the control unit 12 in the CPU 11 of the mobile telephone generates a signal to move the selection frame in the upward direction on the display screen 52 shown in FIG. 2a. Further, if the pointing device is operated into the range of the third and fourth quadrants shown in FIG. 3a, the control unit 12 generates a signal to move the selection frame in the downward direction on the display screen 52 shown in FIG. 2a.

Thus, according to this embodiment, when the pointing device is in the vertical directional operation mode a, if the pointing device is operated, the selection frame on the display screen 52 is moved in the upward or downward direction along the row of the icons 54.

Here, in order to further improve the user's operability, a dead zone may be provided in the operation direction of the pointing device. More specifically, a dead zone may be disposed near the boundary where the operation of the pointing-device is changed to either the upward or downward direction (around 0 degrees and 180 degrees) so as to prevent the selection frame from being moved unstably on the display screen due to unconscious operation of the pointing device and the like and, further, to allow the user to be aware of the vertical direction of the operation intuitively.

For example, as shown in FIG. 3b, the control unit 12 may be configured so that it outputs a signal to move the selection frame on the display screen 52 in the upward direction when the pointing device is operated in the range from 70 degrees to 110 degrees and it outputs a signal to move the selection frame in the downward direction when the pointing device is operated in the range from 250 degrees to 290 degrees. Here, it is to be noted that the present invention is not limited to these values and other values may be alternatively used.

Figure 4A:
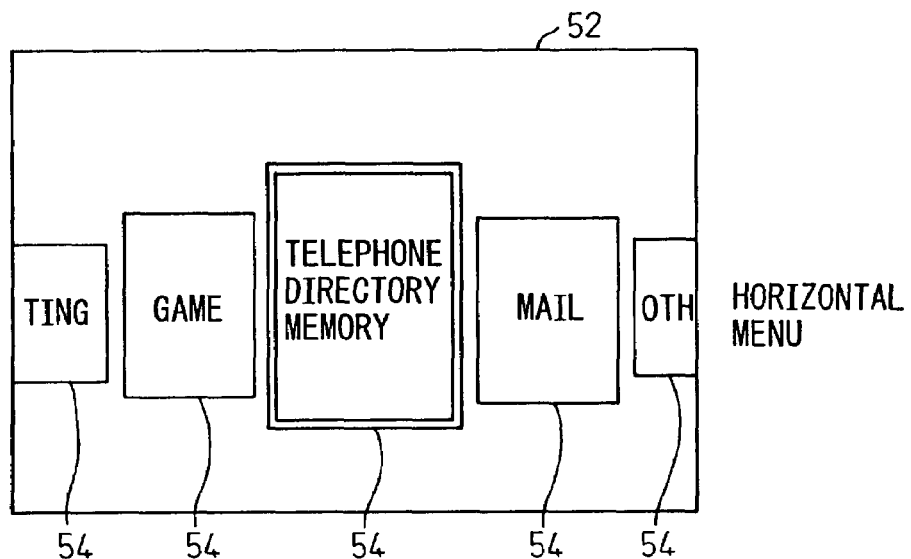
FIG. 4a is a diagram showing a menu representation in which icons are arranged in a horizontal direction on the display screen in the mobile telephone provided with the pointing device according to the embodiment of the present invention.
Figure 4B:
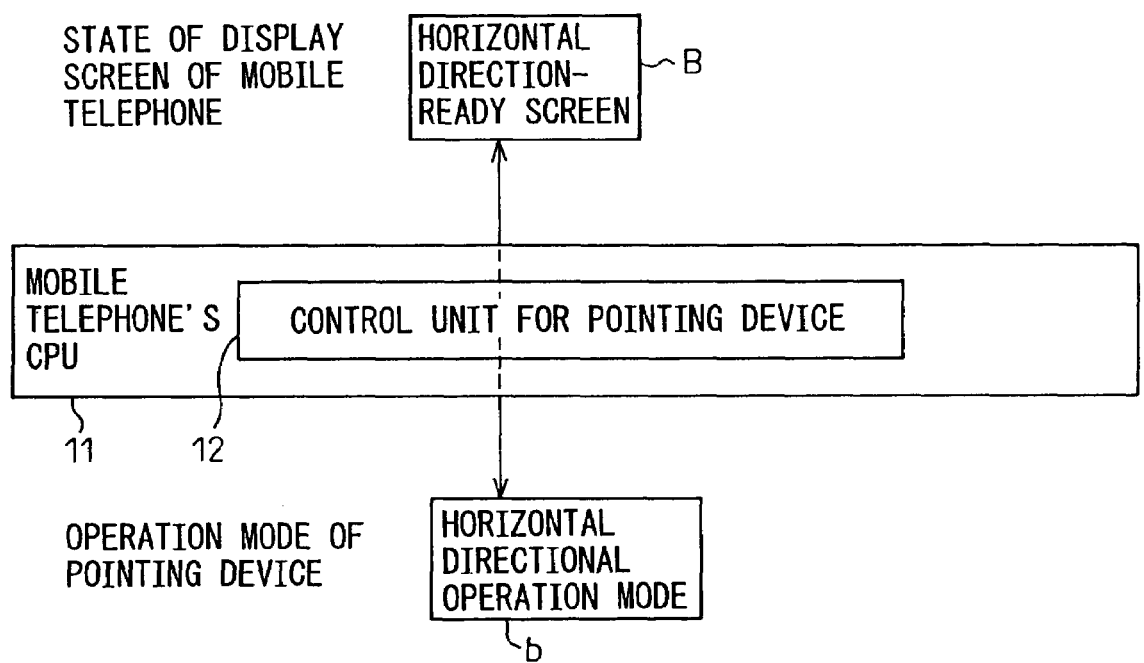
FIG. 4b is a functional block diagram of the pointing device shown in FIG. 4a in the mobile telephone provided with the pointing device according to the embodiment of the present invention.
Figure 5A:
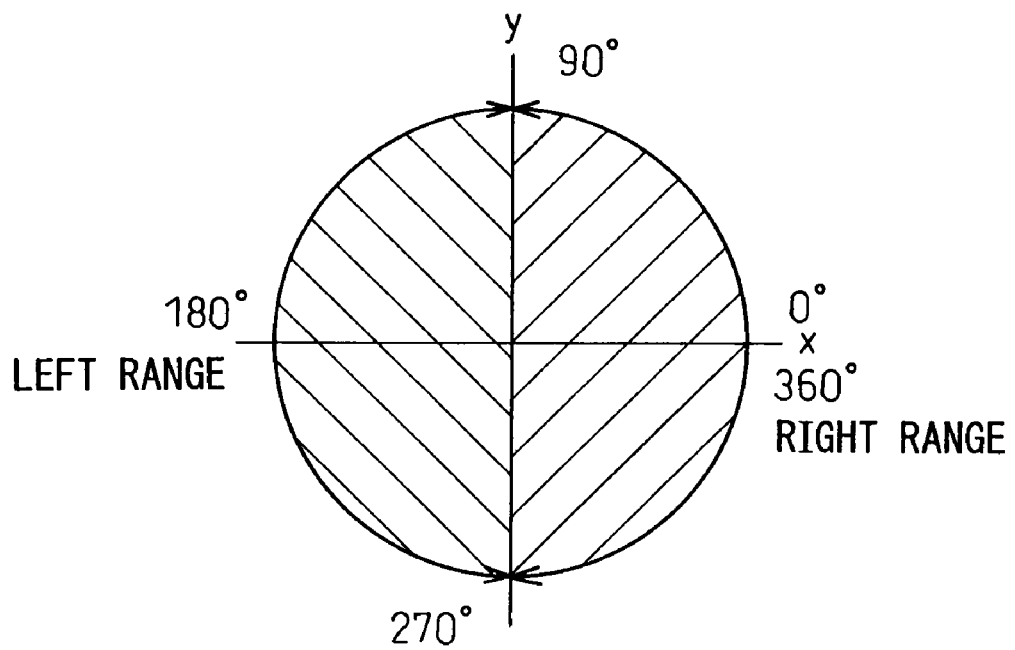
FIGS. 5a and 5b are diagrams showing a range in which the pointing device can be operated when the pointing device according to the embodiment of the present invention is in a horizontal directional operation mode.
Figure 5B:
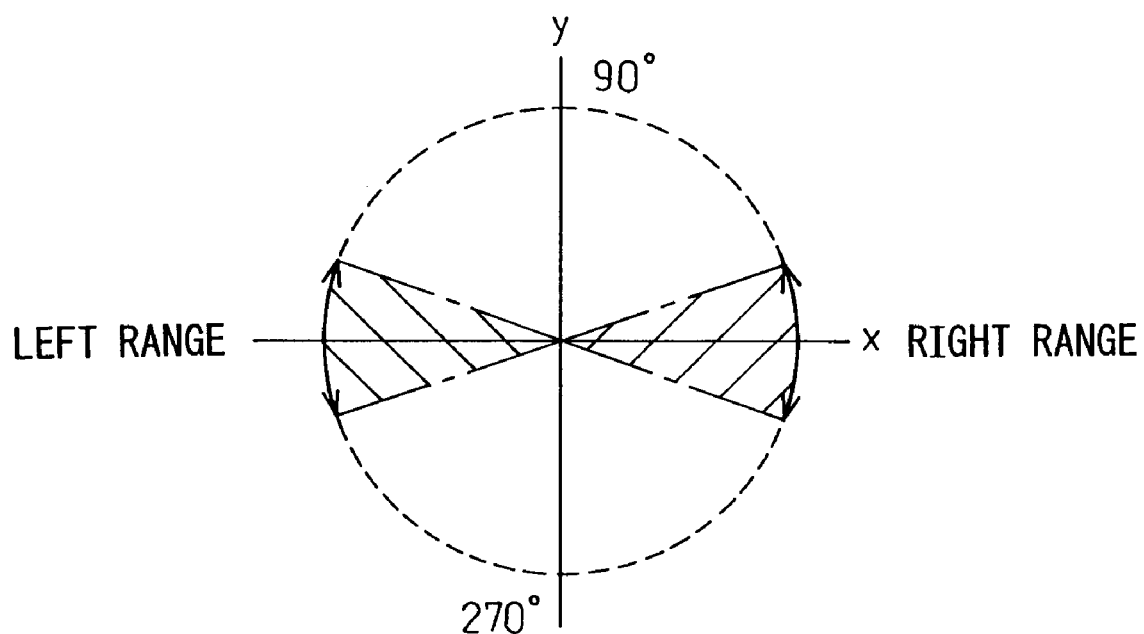

FIG. 4a is a diagram showing a menu representation in which icons are arranged in the horizontal direction on the display screen in the mobile telephone provided with the pointing device according to the embodiment of the present invention. FIG. 4b is a functional block diagram of the pointing device shown in FIG. 4a in the mobile telephone provided with the pointing device according to the embodiment of the present invention. FIGS. 5a and 5b are diagrams showing a range in which the pointing device can be operated when the pointing device according to the embodiment of the present invention is in the horizontal directional operation mode.

As described above, as the CPU 11 of the mobile telephone controls the various processes of the mobile telephone in an integrated manner, it can grasp the contents displayed on the display screen 52 at present as shown in FIG. 4a. When the present display screen 52 appears as the horizontal direction-ready screen B, as shown in FIG. 4b, the control unit 12 implemented in the CPU 11 in the form of firmware allows the pointing device to operate in the horizontal directional operation mode b in which the moving direction of the selection frame on the display screen 52 is limited to the horizontal direction only.

According to this embodiment, when the pointing device is in the horizontal directional operation mode b, if the pointing device is operated into the range of the first and fourth quadrants shown in FIG. 5a, the control unit 12 in the CPU 11 of the mobile telephone generates a signal to move the selection frame in the right direction on the display screen 52 shown in FIG. 4a. Further, if the pointing device is operated into the range of the second and third quadrants shown in FIG. 5a, the control unit 12 generates a signal to move the selection frame in the left direction on the display screen 52.

Thus, according to this embodiment, when the pointing device is in the horizontal directional operation mode b, if the pointing device is operated, the selection frame on the display screen 52 is moved in the right or left direction along the row of the icons 54.

Here, in order to further improve the user's operability, just as in the case described above with reference to FIG. 3b, a dead zone may be provided in the operation direction of the pointing device. For example, as shown in FIG. 5b, the control unit 12 may be configured so that it outputs a signal to move the selection frame on the display screen 52 in the right direction when the pointing device is operated in the range from 340 degrees (or −20 degrees) to 20 degrees and it outputs a signal to move the selection frame in the left direction when the pointing device is operated in the range of 160 degrees to 200 degrees. It may also allow the user to be aware of the right and left directions of the operation intuitively. Here, it is to be noted that the present invention is not limited to these values and other values may be alternatively used.

Figure 6B:
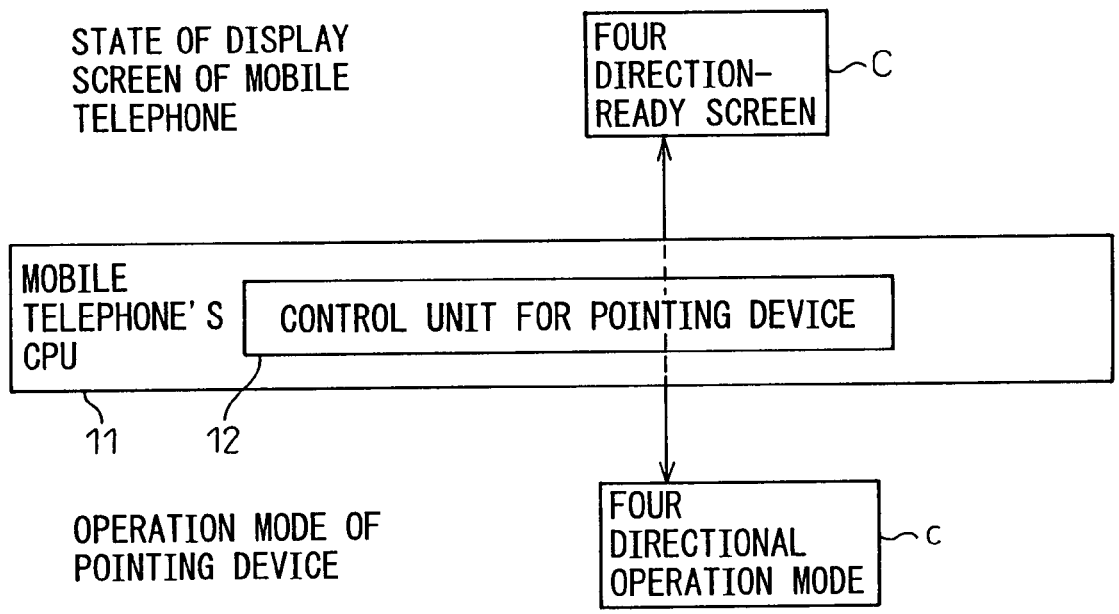
FIGS. 6b and 6c are functional block diagrams of the pointing device shown in FIG. 6a in the mobile telephone provided with the pointing device according to the embodiment of the present invention.

FIG. 6a is a diagram showing a menu representation in which icons are arranged in both vertical and horizontal directions in the mobile telephone provided with the pointing device according to the embodiment of the present invention. FIG. 6b is a functional block diagram of the pointing device shown in FIG. 6a in the mobile telephone provided with the pointing device according to the embodiment of the present invention. Further, FIGS. 7a-7c are diagrams showing a range in which the pointing device can be operated when the pointing device according to the embodiment of the present invention is in a four-directional operation mode.

As the CPU 11 of the mobile telephone can grasp the contents displayed on the display screen at present as described above, when the present display screen 52 appears as the four direction-ready screen C as shown in FIG. 6a in which the icons 54 are arranged in, for example, three rows and three columns, as shown in FIG. 6b, the control unit 12 in the CPU 11 allows the pointing device to be operated in the four directional operation mode c in which the moving direction of the selection frame (the frame enclosed in double lines in the figure) on the display screen 52 is limited to the vertical or horizontal direction only.

Figure 7A:
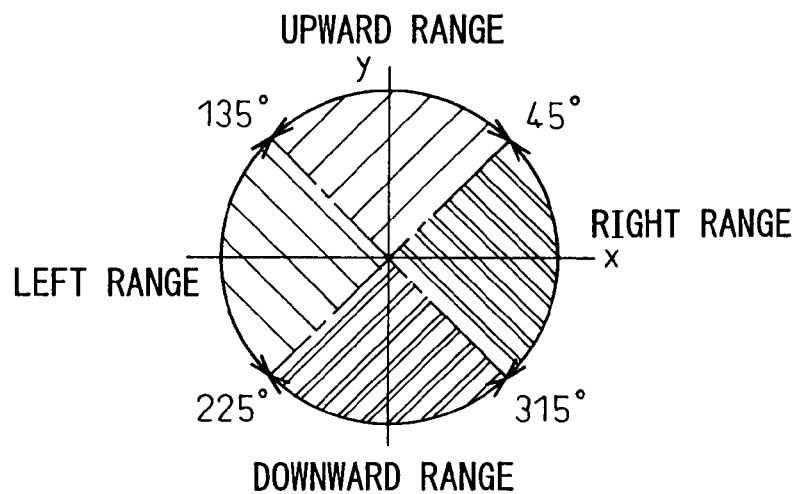
FIGS. 7a-7c are diagrams showing a range in which the pointing device can be operated when the pointing device according to the embodiment of the present invention is in a four-directional operation mode.
Figure 7B:
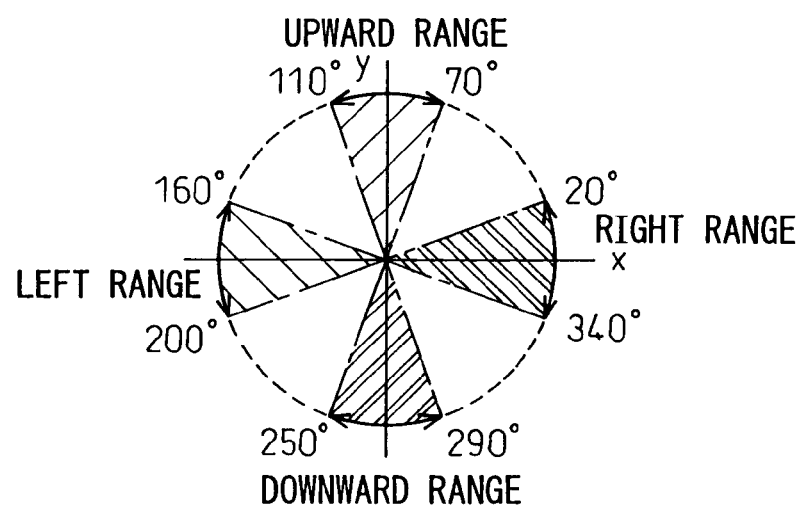
Figure 7C:
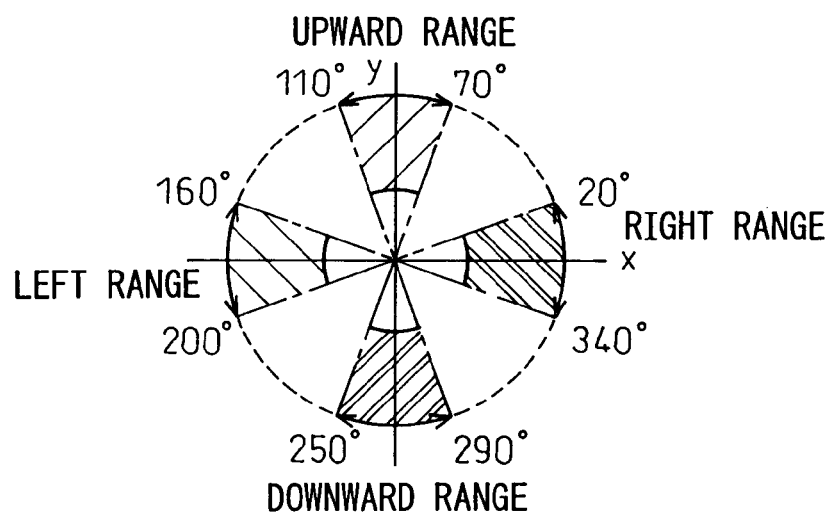

According to this embodiment, when the pointing device is in the four directional operation mode c, if the pointing device is operated into the range from 45 degrees to 135 degrees in FIG. 7a, the control unit 12 in the CPU 11 of the mobile telephone generates a signal to move the selection frame in the upward direction on the display screen 52 shown in FIG. 6a. Further, if the pointing device is operated into the range from 135 degrees to 225 degrees in FIG. 7a, the control unit 12 generates a signal to move the selection frame in the left direction on the display screen 52. Still further, if the pointing device is operated into the range from 225 degrees to 315 degrees in FIG. 7a, the control unit 12 generates a signal to move the selection frame in the downward direction on the display screen 52. Still further, if the pointing device is operated into the range from 315 degrees (or −45 degrees) to 45 degrees, the control unit 12 generates a signal to move the selection frame in the right direction on the display screen 52.

Thus, according to this embodiment, when the pointing device is in the four directional operation mode c, if the pointing device is operated, the selection frame on the display screen 52 is moved in either of the upward, downward, left or right direction along the row of the icons 54.

Here, in order to further improve the user's operability, just as the case described above with reference to FIG. 3b, a dead zone may be provided in the operation direction of the pointing device. For example, as shown in FIG. 7b, the control unit 12 may be configured so that it outputs a signal to move the selection frame on the display screen 52 in the upward direction when the pointing device is operated in the range of 70 degrees to 110 degrees, it outputs a signal to move the selection frame in the left direction when the pointing device is operated in the range of 160 degrees to 200 degrees, it outputs a signal to move the selection frame in the downward direction when the pointing device is operated in the range of 250 degrees to 290 degrees, and it outputs a signal to move the selection frame in the right direction when the pointing device is operated in the range of 340 degrees (or −20 degrees) to 20 degrees. It may allow the user to be aware of the upward, downward, left and right directions of the operation intuitively. Here, it is to be noted that the present invention is not limited by these values and other values may be alternatively used.

Further, in order to further improve the user's operability, in addition to the operational range shown in FIG. 7b above, a further dead zone may be provided around the center of the xy plane that approximates the return position of the pointing device. It may reduce the possibility that the selection frame may be moved even by any subtle variation of the pointing device that is not intended by the user. Here, it is to be noted that the present invention is not limited by the range of the dead zone in this case and this range may be determined in consideration of various factors such as the operability, size and functions of the mobile telephone.

Figure 6C:
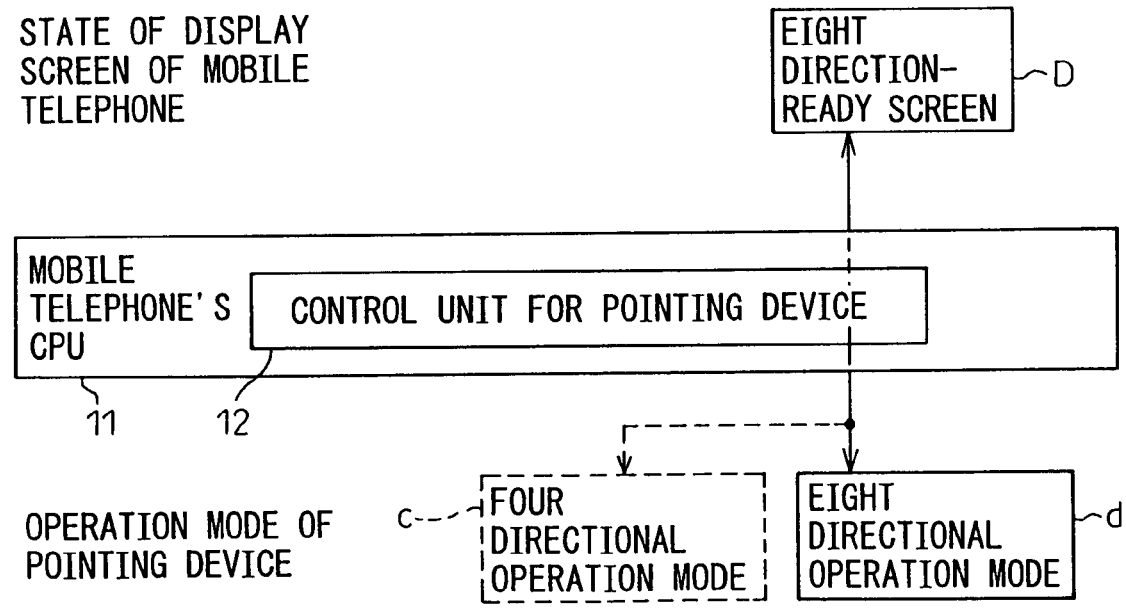

Thus, the menu representation in which the icons 54 are arranged in three rows and three columns is shown in FIG. 6a as an example. However, in the case of a menu representation in which more icons are indicated, the operability may be further improved if the selection frame can be moved not only in the four directions of up, down, left and right, but also in eight directions in total including diagonal four directions toward the icons adjacent to the center. At this time, the screen appears as the eight direction-ready screen D and the pointing device is operated in the eight directional operation mode d as shown in FIG. 6c correspondingly.

The relationship between the range in which the pointing device can be operated and the direction in which the selection frame is moved in the eight directional operation mode d may be determined in a manner similar to the other operation modes. More specifically, the range of 360 degrees in which the pointing device is operated may be divided into eight regions and each of the eight regions may be assigned to the directions in which the selection frame on the display screen is moved. At this time, just as in the other operation modes described above, a dead zone may be provided for the operation of the pointing device.

Though the pointing device is operated in the eight directional operation mode to correspond to the display screen appearing as the menu representation in which many icons are shown in the above description, the pointing device may still be operated in the four directional operation mode c described above.

The control unit 12 of the pointing device provided in the CPU 11 of the mobile telephone changes each of the operation modes described above according to the contents displayed on the display screen as shown in FIG. 1. Of course, the operation mode can be changed to the any directional operation mode that is one of the features of the pointing device and in which the operational object on the display screen can be moved in any direction.

Further, though the range of 360 degrees in which the pointing device can be operated is divided equally by the number of the directions in which the operational object such as the cursor, the pointer or the selection frame on the display screen can be moved in this embodiment, the directions in which the operational object can be moved may be weighted in advance so that, for example, the pointing device can be operated in a wider or narrower range in a predetermined moving direction of the operational object.

As described above, according to this embodiment, in the pointing device that can be operated to move the operational object on the display screen in any direction, as the operation mode of the pointing device is changed automatically according to the contents displayed on the display screen of the apparatus in which the pointing device is provided so as to limit the direction in which the operational object on the present display screen, the user can enjoy the operability of the pointing device that is most suitable for the application used at present.

Thus, according to this embodiment, even when the pointing device is used for the application that does not need to move the operational object such as the cursor, the pointer or the selection frame on the display screen in any direction, the user can operate the pointing device without a sense of incongruity.

Further, by providing a dead zone in the operational range of the pointing device, any unnecessary movement of the operational object can be eliminated and the user's operability can be further improved.

Next, a variation of the embodiment of the present invention will be described.

The pointing device is characterized not only in that it can be operated in any direction but also in that it can move the operational object such as the cursor, the pointer or the selection frame on the display screen at a speed that depends on an amount of operation.

However, when the display screen appears as a menu representation, the operability may be improved by keeping a moving speed of the operational object or the selection frame constant to some extent. Therefore, in this variation, the amount of movement of the operational object is adjusted to keep the moving speed of the operational object on the display screen constant in a predetermined case.

Figure 8:
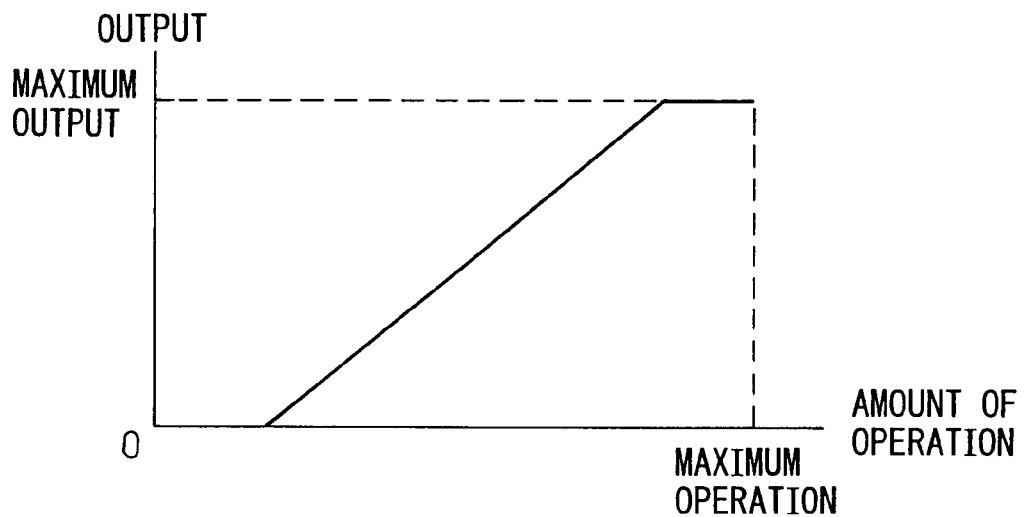
FIG. 8 is a diagram showing a relationship between an amount of operation of the pointing device and a signal output from the pointing device in the pointing device according to a variation of the embodiment of the present invention.
Figure 9:
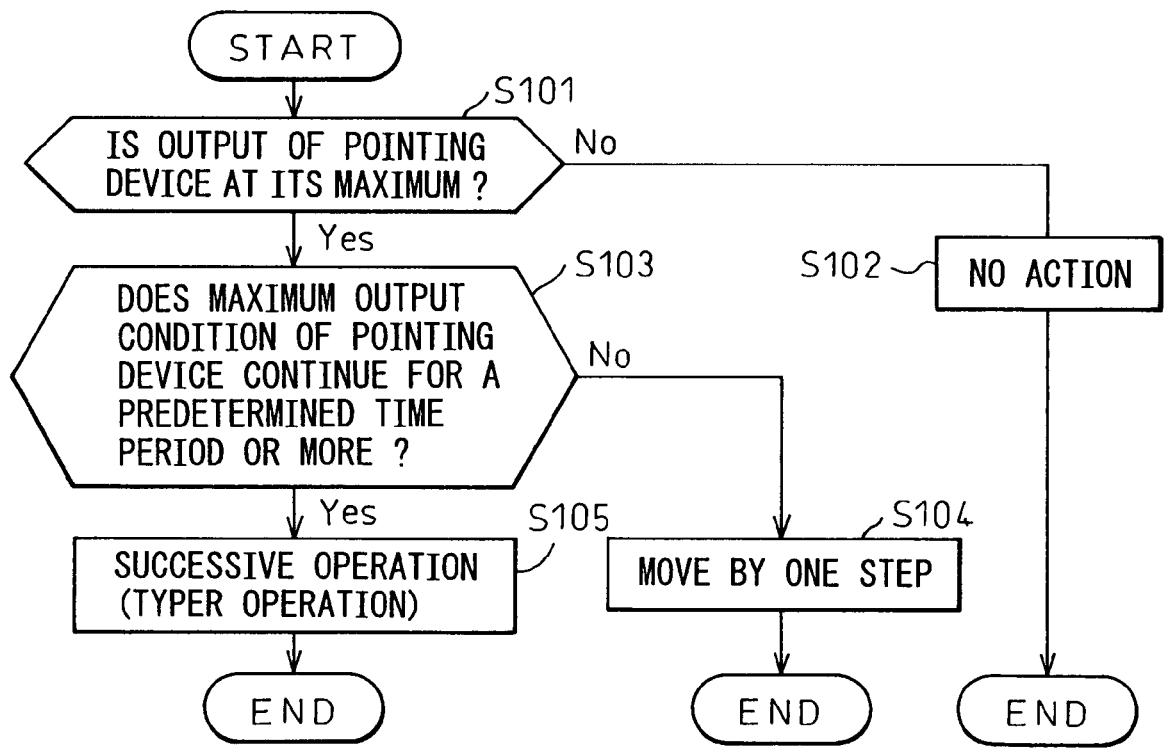
FIG. 9 is a flow chart showing an operational flow of the pointing device according to the variation of the embodiment of the present invention.

FIG. 8 is a diagram showing a relationship between an amount of operation of the pointing device and a signal output from the pointing device in the pointing device according to the variation of the embodiment of the present invention. Further, FIG. 9 is a flow chart showing an operational flow of the pointing device according to the variation of the embodiment of the present invention.

As shown in FIG. 8, in the pointing device, the signal output is typically increased depending on the amount of operation. Then, the magnitude of this signal output corresponds to the moving speed of the operational object on the display screen.

In this variation, the control unit 12 of the pointing device outputs a signal to move the operational object on the display screen by one step when the pointing device outputs the maximum signal which is, in turn, generated when the pointing device is operated at its maximum. Thus, this one step is a unit by which the selection frame located on an icon is moved to the adjacent icon when the menu is displayed.

Further, the control unit 12 of the pointing device preferably performs an operation in which the control unit 12 outputs a signal to move the operational object successively in the menu representation on the display screen when the maximum signal output continues for a predetermined time period or more. Such an operation is generally called "typer operation" in the technical field.

The above operation can be summarized as shown in FIG. 9.

First, in step S101, it is determined whether the output of the pointing device is at its maximum or not. If the output of the pointing device is not at its maximum, nothing is done (step S102).

If the output of the pointing device is at its maximum, then, in step S103, it is determined whether the state in which the output of the pointing device is at its maximum continues for a predetermined time period or more or not.

If the state in which the output of the pointing device is at its maximum does not continue for a predetermined time period or more, then, in step S104, the operational object on the display screen is moved by one step.

If the state in which the output of the pointing device is at its maximum continues for a predetermined time period or more, then, in step S105, the typer operation is performed so that the operational object on the display screen is moved successively.

A further variation of this embodiment of the present invention will be described.

Figure 10:
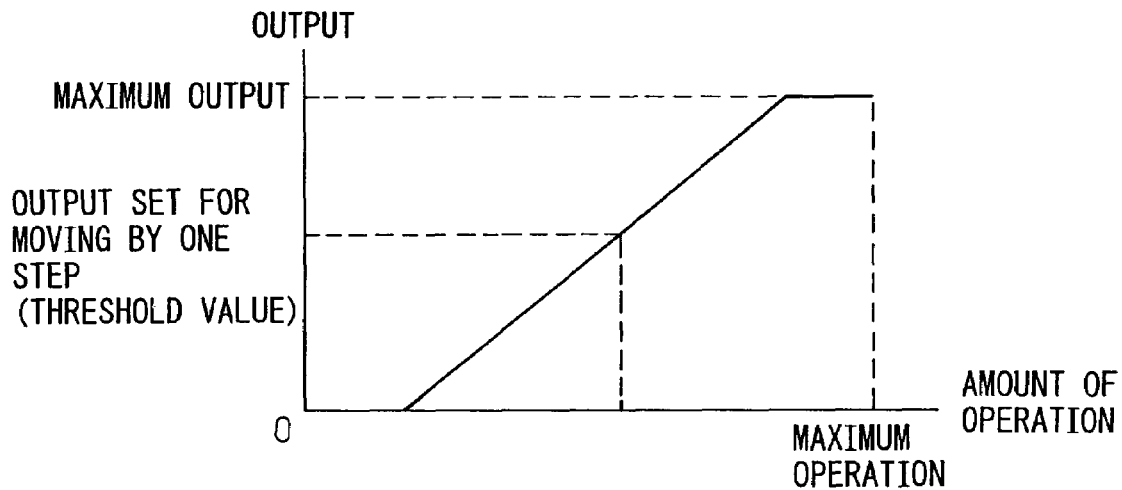
FIG. 10 is a diagram showing a relationship between an amount of operation of the pointing device and a signal output from the pointing device in the pointing device according to a further variation of the embodiment of the present invention.

FIG. 10 is a diagram showing a relationship between an amount of operation of the pointing device and a signal output from the pointing device in the pointing device according to a further variation of the embodiment of the present invention. Further, FIG. 11 is a flow chart showing an operational flow of the pointing device according to the further variation of the embodiment of the present invention.

In the variation described above, though the state in which the pointing device is operated at its maximum is employed, in some pointing devices, the amount of operation (the operation stroke) may be too large to provide the maximum output signal.

In view of the above problem, in a further variation, as shown in FIG. 10, a threshold value is defined for the output of the pointing device so that the control unit 12 of the pointing device outputs a signal to move the operational object on the display screen by one step when the signal output from the pointing device exceeds the threshold value. Further, the control unit 12 of the pointing device preferably performs the typer operation in which the control unit 12 outputs a signal to move the operational object successively in the menu representation on the display screen when the such signal output of the pointing device continues for a predetermined time period or more.

Figure 11:
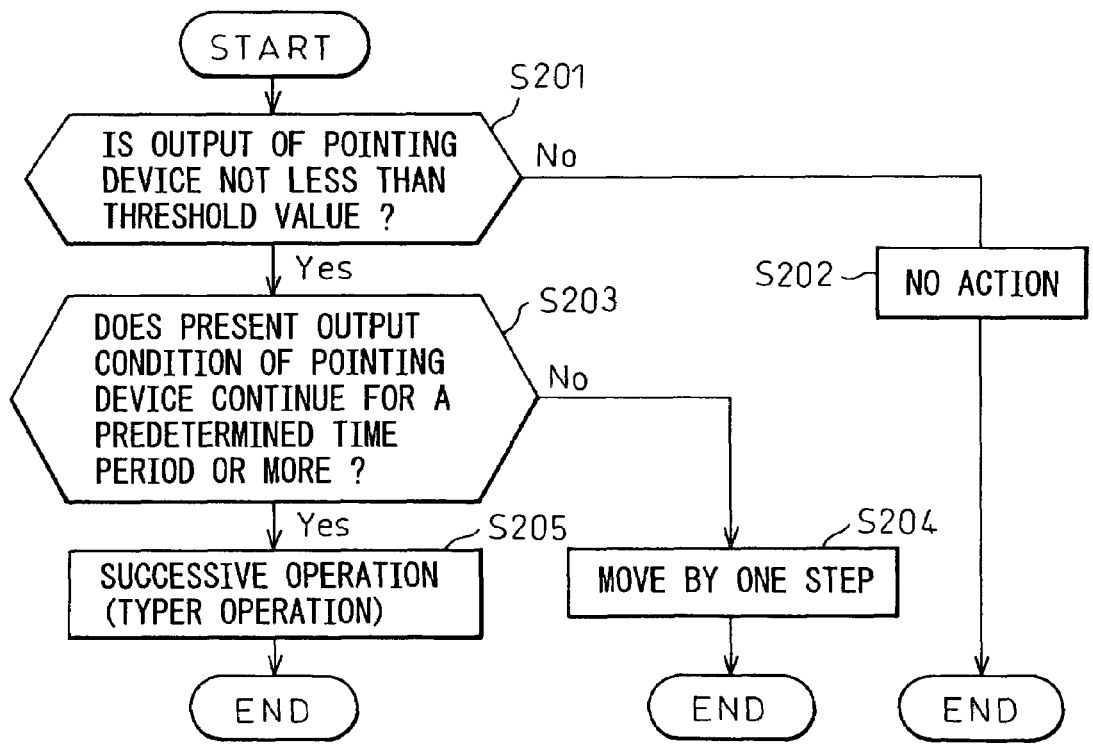
FIG. 11 is a flow chart showing an operational flow of the pointing device according to the further variation of the embodiment of the present invention.
Figure 14:
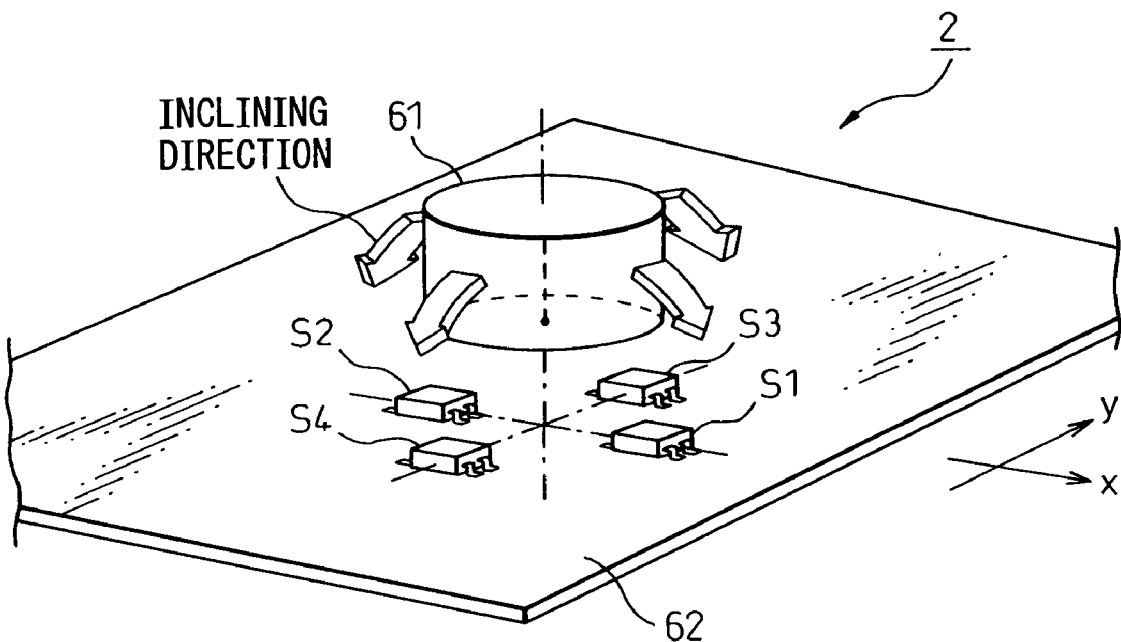
FIG. 14 is a principle drawing (1) of the pointing device employing variation of magnetism.
Figure 15:
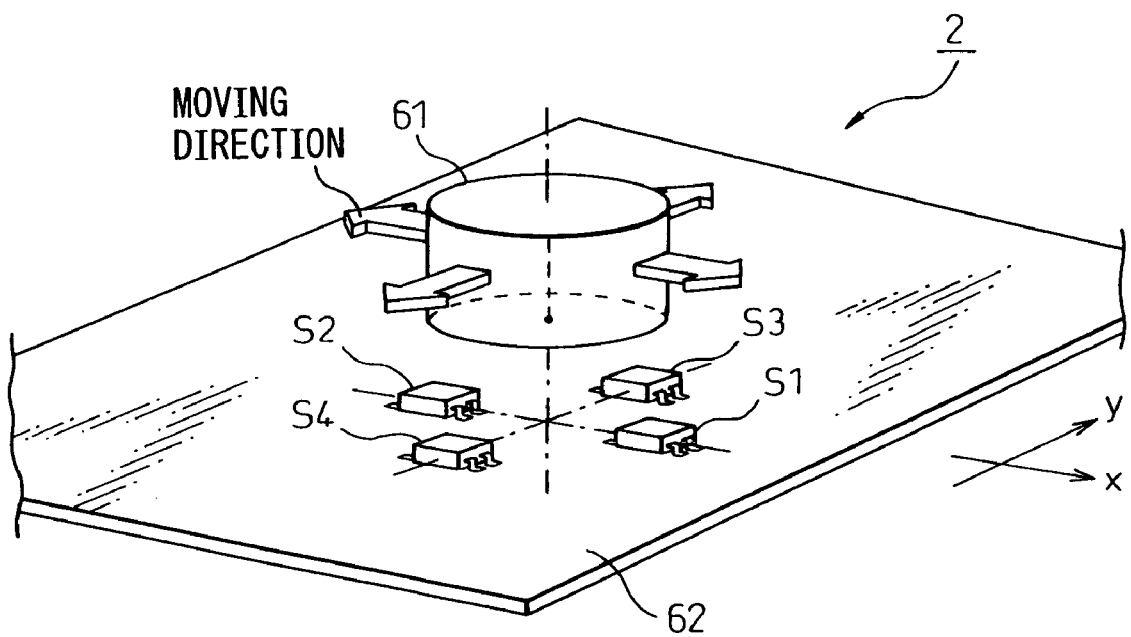
FIG. 15 is a principle drawing (2) of the pointing device employing variation of magnetism.

The above operation can be summarized as shown in FIG. 11.

First, in step S201, it is determined whether the output of the pointing device is not less than the threshold value or not. If the output of the pointing device is less than the threshold value, nothing is done (step S202).

If the output of the pointing device is not less than the threshold value, then, in step S203, it is determined whether this output state of the pointing device continues for a predetermined time period or more or not.

If this output state does not continue for a predetermined time period or more, then, in step S204, the operational object on the display screen is moved by one step.

If this output state continues for a predetermined time period or more, then, in step S205, the typer operation is performed so that the operational object on the display screen is moved successively.

As described above, according to the variation or the further variation of the embodiment of the present invention, even in the pointing device that can move the operational object such as the cursor, the pointer or the selection frame on the display screen at a speed depending on the amount of operation, as the moving speed of the operational object on the display screen can easily be kept constant, the operability cannot be degraded even when the display screen appears as the menu representation.

As described above, according to the present invention, in the pointing device that can be operated to move the operational object on the display screen in any 360-degree direction, as the operation mode of the pointing device is changed automatically according to the contents displayed on the display screen of the apparatus in which this pointing device is provided so as to limit the direction in which the operational object on the present display screen is moved, the user can enjoy the operability of the pointing device that is most suitable for the application being used.

Thus, according to the present invention, even when the pointing device is used for an application that does not need to move the operational object such as the cursor, the pointer or the selection frame on the display screen in any direction, the user can operate the pointing device without a sense of incongruity.

Further, by providing a dead zone in the operational range of the pointing device, any unnecessary movement of the operational object can be eliminated and the user's operability can be further improved.

The present invention is particularly effective in the mobile telephone in which the icons of various features and usages that the user can select are displayed as the menu in vertical and/or horizontal directions in rows. Further, the present invention is also effective when the operability may be improved by limiting the direction in which the operational object such as the cursor, the pointer or the selection frame on the display screen with regard to the applications such as a map or games provided in the mobile telephone.

Still further, in addition to the mobile telephone described in detail with regard to the embodiment, also in mobile information terminals such as a PDA or an electronic organizer or in information processing equipment such as a computer that is provided with a display screen and a pointing device, the present invention is particularly effective when the contents displayed on the display screen may be modified according to the application being utilized by the user.

What is claimed is:

1. A pointing device that can be operated to move an operational object on a display screen in any 360-degree direction, comprising:
a control unit changing an operation mode of said pointing device according to a positional orientation of contents displayed on said display screen at the time said pointing device is operated,
wherein said control unit determines a direction in which said operational object can be moved on said display screen according to said operation mode to limit the movement of the operational object on the display screen to less than the 360-degree direction based on the positional orientation of contents displayed on the display screen, and wherein said control unit defines the direction in advance in which said operational object can be moved on said display screen, as a current direction in which said pointing device can be operated and has a moving amount adjusting means for moving said operation object by a predetermined step value wherein the control unit outputs a signal to move the operational object in a predetermined manner in a menu representation on the display screen in accordance with a continuous signal from said pointing device for a predetermined time period.

2. A pointing device according to claim 1, wherein when said display screen displays icons, the movement of the operational object is limited to only the direction in which the icons are arranged.

3. A pointing device according to claim 1, wherein based on the contents displayed on said display screen, the movement of the operational object is limited to one or more of horizontal, vertical or diagonal directions on the display screen.

4. A mobile telephone comprising a pointing device according to claim 1.

5. A mobile telephone according to claim 4, wherein said control unit is constituted in a main control unit of said mobile telephone.

6. A pointing device according to claim 4, wherein said moving amount adjusting means moves said operational object by the predetermined step value when the amount of operation of said pointing device takes the maximum value.

7. A pointing device according to claim 4, wherein said moving amount adjusting means move said operational object by the predetermined step value when the amount of operation of said pointing device exceeds a predetermined threshold value.

8. A method for controlling a pointing device that can be operated to move an operational object on a display screen in any 360-degree direction, comprising the controlling step of:
changing an operational mode of said pointing device in advance according to a positional orientation of contents displayed on said display screen at the time said pointing device is operated,
wherein a direction in which said operational object can be moved on said display screen is determined according to said operation mode to limit the movement of the operational object on the display screen to less than the 360-degree direction based on the positional orientation of contents displayed on the display screen, and wherein the direction in which said operational object can be moved on said display screen is defined in advance as a current direction in which said pointing device can be operated, and said operational object is moved by a predetermined step value and a signal is output to move the operational object in a predetermined manner in a menu representation on the display screen in accordance with a continuous signal from said pointing device for a predetermined time period.

9. A method according to claim 8, wherein said direction in which said operational object can be moved on said display screen is defined as a current direction in which said pointing device can be operated.

10. A method for controlling a pointing device according to claim 9, wherein the pointing device can be operated to move said operational object at any speed, and wherein said controlling step has a moving amount adjusting step of moving said operational object by a constant step value when said pointing device is operated in a predetermined operational mode.

11. A mobile telephone, comprising:
a pointing device that can be operated to move an operational object on a display screen in any 360-degree direction; and
a control unit changing an operation mode of said pointing device according to a positional orientation of contents displayed on said display screen at the time said pointing device is operated,
wherein said control unit determines a direction in which said operational object can be moved on said display screen according to said operation mode to limit the movement of the operational object on the display screen to less than the 360-degree direction based on the positional orientation of contents displayed on the display screen, and wherein said control unit defines the direction in advance in which said operational object can be moved on said display screen, as a current direction in which said pointing device can be operated and has a moving amount adjusting means for moving said operation object by a predetermined step value wherein the control unit outputs a signal to move the operational object in a predetermined manner in a menu representation on the display screen in accordance with a continuous signal from said pointing device for a predetermined time period.

12. A mobile telephone according to claim 11, wherein said moving amount adjusting means move said operational object by the predetermined step value when the amount of operation of said pointing device takes the maximum value.

13. A mobile telephone according to claim 12, wherein said moving amount adjusting means move said operational object by the predetermined step value when the amount of operation of said pointing device exceeds a predetermined threshold value.

14. A mobile telephone according to claim 11, wherein said control unit is constituted in a main control unit of said mobile telephone.

15. A mobile communication apparatus, comprising:
a pointing device configured to operate an operational object on a display screen of the mobile communication apparatus; and
a control unit configured to switch an operation mode of the pointing device between a mode in which the operational object has 360-degree movement on the display screen and a mode in which the operational object is limited to less than 360-degree movement on the display screen according to an application that is running on the mobile communication apparatus at the time the pointing device is operated, wherein said control unit defines the direction in advance in which said operational object can be moved on said display screen, as a current direction in which said pointing device can be operated and has a moving amount adjusting means for moving said operation object by a predetermined step value wherein the control unit outputs a signal to move the operational object in a predetermined manner in a menu representation on the display screen in accordance with a continuous signal from said pointing device for a predetermined time period.

* * * * *